March 15, 1966 C. T. FREERKS ETAL 3,239,971

DISC SANDING TOOL

Filed Aug. 30, 1963

INVENTORS
CONRAD T. FREERKS
ARVID L. GAFKJEN
BY
Carpenter, Abbott, Coulter & Kinney
ATTORNEYS

United States Patent Office 3,239,971
Patented Mar. 15, 1966

3,239,971
DISC SANDING TOOL

Conrad T. Freerks and Arvid L. Gafkjen, St. Paul, Minn., assignors to Minnesota Mining and Manufacturing Company, St. Paul, Minn., a corporation of Delaware
Filed Aug. 30, 1963, Ser. No. 305,589
6 Claims. (Cl. 51—379)

This invention relates to abrasive disc devices, particularly to devices employing coated abrasive discs which can be installed quickly, removed easily, and replaced readily.

Portable disc sanders commonly employ a flexible backup pad, to the front face of which is attached an abrasive disc, the backup pad being rotated while the operator forces the disc face against a workpiece. A typical disc has a circular center hole which is slipped over a threaded rod extending through the center of the backup pad, the disc being held in place by a nut and washer assembly thereafter threaded on the rod. In order to use as much of the abrasive surface of the disc as possible, the nut and washer are made thin and small, necessitating special equipment to tighten or loosen the nut. Often the bolt threads become clogged with detritus, or the nut and washer become misplaced, further adding to the operator's annoyance.

Many attempts have been made to devise a sander on which coated abrasive discs could be quickly installed and readily removed. Numerous devices have been proposed which employ spring fastening arrangements by which a bayonet-pin bolt is inserted through the center hole in the disc and forced against a spring until it snaps into position. Such devices are generally insufficient to prevent disc slippage, and the pressure which occurs during sanding operations tends to loosen the spring holding arrangement. Discs have also been provided with central radially extending slots, wings on the backup pad extending through the slots and holding the disc in position. This arrangement does not grip a disc firmly, permitting it to flap unduly and frequently tearing out the slots before the disc has been worn out. In many operations, particularly where the discs are 4 inches in diameter or smaller and where the disc backing is cloth or paper, a normally tacky and pressure-sensitive adhesive is coated on the back of the disc, which is then adhered directly to the backup pad. Although this technique is effective, the discs are expensive to prepare, and, once a disc has been removed, it is almost impossible to install it again. Further, only relatively "dead" backup pads can be used, since excessive stretch or distortion weakens the adhesion of the disc to the backing.

We have now devised an extremely simple disc sanding device which obviates the disadvantages heretofore existing in prior art equipment. Devices constructed in accordance with our invention are provided with abrasive discs which can be quickly removed, readily reinstalled if necessary, and which require no special equipment to manipulate. Such devices have a minimum number of individual parts; in fact, in a preferred form of our invention an operator can remove one disc and install another without removing any part of the holding equipment at all.

Our invention comprises a circular, hexagonal, octagonal, or other backup pad having an axial hole through which the shank of a bolt extends. The head of the bolt is positioned at the face of the backup pad, the head being non-circular and greater in area than the cross-section of the shank. An abrasive disc having a center hole which is approximately the same size and shape as the greatest cross-section of the head is slipped over the head and rotated so that the head overlaps the solid portion of the disc. Means mounted at the rear of the backup pad is then actuated to urge the head toward the backup pad, thereby gripping the disc between the head and the pad. The entire assembly is attached to a driving means which rotates the backup pad, and with it the abrasive disc. When it is desired to remove the disc, the head is moved away from the backup pad and the disc rotated so that its center hole is in alignment with the bolt head. Using our device an operator who has a variety of sanding requirements may remove a coarse grit disc without injuring it, replace it with a fine grit disc, and thereafter reinstall the previously removed coarse grit disc for further use.

Our invention will be better understood upon reference to the attached drawings, in which like numbers refer to like parts in the several views and in which.

Figures 1, 2, 3, 4, 5, 6:
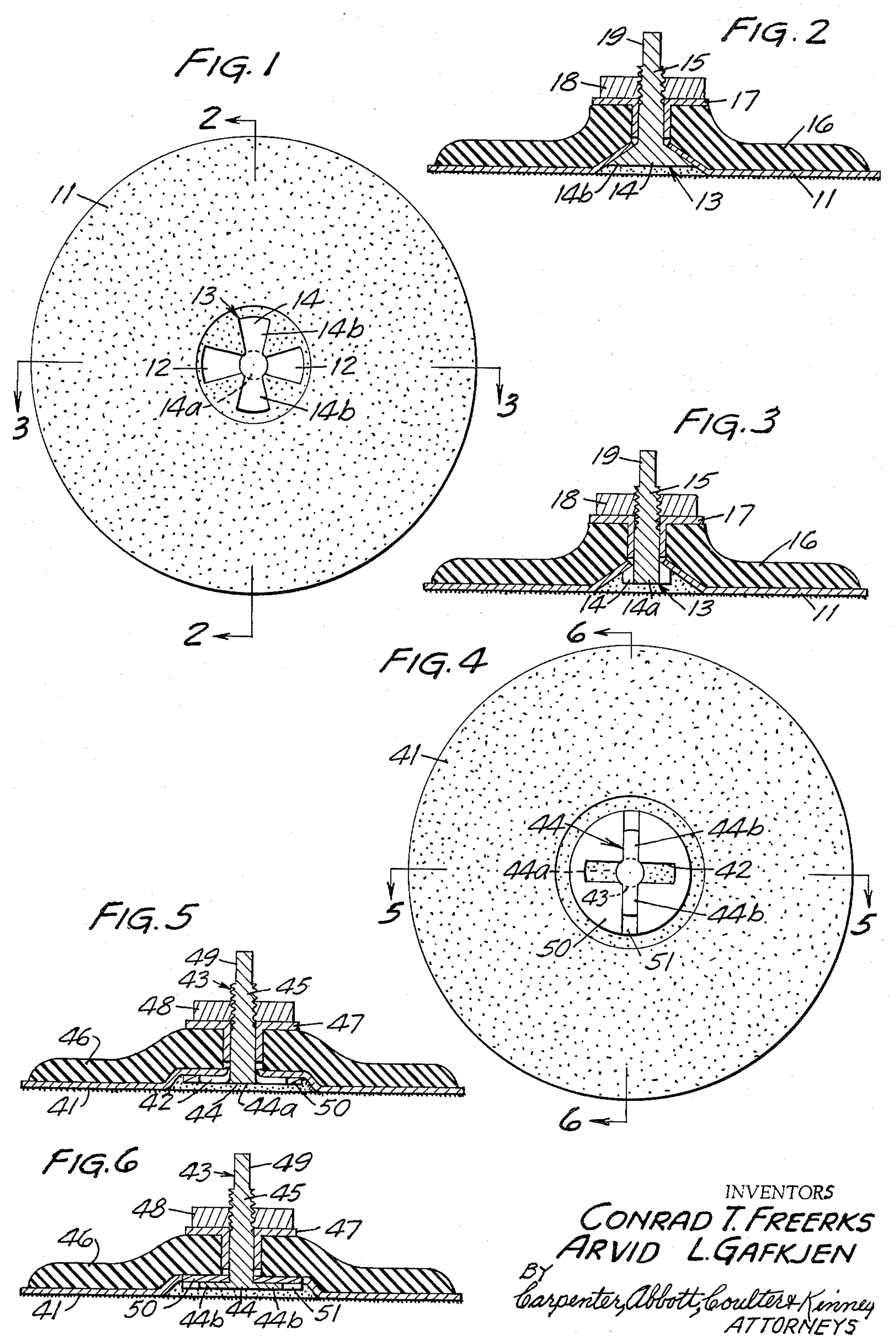
FIGURE 1 represents a plan view of an abrasive disc sanding device in accordance with our invention.
FIGURE 2 is a cross-section of the device shown in FIGURE 1 taken along section lines 2—2.
FIGURE 3 is a cross-section of the device shown in FIGURE 1 taken along section lines 3—3.
FIGURE 4 is a plan view of an alternate construction of our abrasive device.
FIGURE 5 is a cross-section of the device shown in FIGURE 4 taken along section lines 5—5.
FIG. 6 is a cross-sectional view of the device shown in FIGURE 4 taken along section lines 6—6.

Referring to FIGURES 1–3, it will be noted that abrasive disc 11 is mounted against the face of backup pad 16. Bolt 13, comprising head 14 and threaded shank 15, is positioned so that shank 15 extends through disc center hole 12 and through the center of backup pad 16, the tapered under-surface of head 14 bearing against the abrasive surface of disc 11. Flanged sleeve 17 extends through the center of backup pad 16, surrounding a portion of shank 15 and overlying the rear surface of backup pad 16. Nut 18 is threaded over shank 15, serving to urge head 14 toward the face of backup pad 16. The end of shank 15 which is farthest removed from the end 19 is adapted to be gripped by a driving means for rotating bolt 13 and, therewith, backup pad 16 and disc 11.

It will be noted that head 14 is shaped somewhat like one half of a Maltese cross, the lower surface thereof being tapered to permit forcing disc 11 into the recessed central portion of backup pad 16. Center hole 12 of disc 11 has substantially the same size and shape as the cross-section of head 14. When disc 11 is to be installed, center hole 12 is aligned with head 14, slid thereover, and rotated approximately 90°, so that the lower surface of head 14 contacts the abrasive surface of disc 11. Nut 18, which is loosened to permit disc 12 to be slipped over head 14, is now tightened, thereby drawing head 14 firmly against disc 11 and toward the face of backup pad 16. It is normally possible for the operator to tighten nut 18 with his bare hands. The adequacy of this method of tightening is, of course, dependent upon such factors as the relative diameters of shank 15 and nut 18, the diameter of disc 11, the dimensions of head 14, the pitch of the thread, and so on. Generally a coarse grit disc should be held more firmly against backup pad 16 than a fine grit disc to reduce the possibilty of slippage. If the workpiece is relatively hard, e.g., cold rolled steel, less gripping pressure is required than if the workpiece is relatively soft, e.g., solder or white metal. The possibility of slipping can be still further reduced by providing the under surface of head 14 with studs and dieing corresponding holes in disc 11.

The central portion 14*a* of head 14 has approximately the same dimension as the axial cross-section of shank 15, while the radially inner portions of arms 14*b* are somewhat narrower than the diameter of shank 15. This configuration, which is also found in center hole 12, permits disc 11 to be rotated after it is applied over head 14 without its inadvertently slipping off center.

Referring now to FIGURES 4–6, abrasive disc 41 is mounted against the face of backup pad 16. T-shaped bolt 43, comprising head 44 and threaded shank 45, is positioned so that shank 45 extends through disc center hole 42 and through the center of backup pad 46. Flanged sleeve 47 extends through the center of backup pad 46, surrounding a portion of shank 45 and overlying the rear surface of backup pad 46. Nut 48 is threaded over shank 45, serving to urge head 44 toward the face of backup pad 46. The end portion 49 of shank 45 is adapted to be gripped by the chuck of a driving means. Interposed between the lower surface of head 44 and the face of abrasive disc 41 is washer 50. Washer 50 is provided with a central hole which is essentially congruent with the center hole of disc 41 and the cross-section of head 44 of bolt 43. At right angles to the long dimension of the center hole of washer 50 is a depressed groove 51 in which head 44 is seated during normal sanding operations.

To mount a disc on the device shown in FIGURES 4–6, nut 48 is loosened so that head 44 is spaced from the face of backup pad 46. Center hole 42 of disc 41 is then aligned with head 44, slipped thereover, and optionally, but not necessarily rotated 90°. Washer 50 is then similarly aligned, slipped over head 44, and rotated 90° so that the symmetric arms 44*b* of head 44 align with groove 51 in washer 50. Nut 48 is then tightened. This arrangement provides an extremely effective way of gripping larger discs, washer 50 assuring a maximum amount of frictional overlap between the backup pad and the head 44. Groove 51 eliminates any possibility that disc 41 will slip and inadvertently fly off the device while in use. As in the first described embodiment, the central portion of center hole 42 is somewhat larger than the radially extending slots, and bolt head center 44*a* is somewhat wider than arms 44*b* again facilitating the process of insuring correct alignment of disc 41 and pad 46.

The two embodiments just described illustrate the basic principle of our invention, but numerous variations may be employed without deviating from this principle. For example, the bolt head and the center hole of the disc may be triangular, square, star-shaped, oval, cruciform, etc., although intricately shaped center holes are somewhat more difficult and expensive to form. To avoid eccentricity, it is generally desirable to provide bolt heads and disc center holes which are symmetrical about at least one diameter, and preferably two diameters, of a circumscribed circle; it is similarly desirable that a concentric inscribed circle have approximately the same cross-sectional shape as the shank of the bolt. For a 1-inch disc we have found that the diameter for a T-shaped bolt may be ⅛-inch, a satisfactory head having an overall length of 1¼-inch and a width of ⅜-inch. Larger discs require somewhat larger bolt heads and center holes to assure adequate holding power.

What we claim is as follows:

1. A quick-change abrasive disc device comprising in combination:
 a backup pad having an axial hole,
 a bolt having
  a shank substantially the same size as said hole and extending therethrough, and
  a non-circular head, greater in area than the cross-section of said shank, positioned at the face of said backup pad,
 an abrasive disc having a central hole which is approximately the same size and shape as the cross-section of said head, said disc being mounted on said shank against the face of said backup pad,
 a rigid washer smaller in diameter than said disc and having a central hole which is approximately the same size and shape as the cross-section of said head, said washer being
  mounted on said shank,
  positioned between said head and said disc, and
  rotated so that said hole is radially displaced with respect to said head,
 means mounted at the rear of said backup pad for urging said head toward said pad, whereby said disc is held in position, and
 means for attaching the device to a driving means for rotating said backup pad.

2. The device of claim 1 in which said urging means is a nut threaded on said shaft and seated against the rear of said backup pad.

3. The device of claim 1 wherein the head of said bolt is so dimensioned that (a) it is symmetrical about at least one diameter of circumscribed circle and (b) a concentric inscribed circle has approximately the same diameter as said shank.

4. The device of claim 3 wherein the head of said bolt is symmetrical about two diameters of a circumscribed circle.

5. The device of claim 1 wherein said bolt is T-shaped.

6. The device of claim 5 wherein said washer has a diametrically located elongated central hole and, at right angles to said elongated central hole, a depressed groove to accommodate the head of said bolt.

References Cited by the Examiner

UNITED STATES PATENTS

| | | | |
|---|---|---|---|
| 1,941,840 | 1/1934 | Kelsey | 32—59 |
| 2,531,775 | 11/1950 | Kenerson | 51—378 |

ROBERT C. RIORDON, *Primary Examiner.*

LESTER M. SWINGLE, *Examiner.*